United States Patent
Yeh et al.

(10) Patent No.: US 9,425,451 B2
(45) Date of Patent: Aug. 23, 2016

(54) SEPARATOR OF LITHIUM BATTERY AND MANUFACTURING METHOD THEREOF

(71) Applicant: BenQ Materials Corporation, Taoyuan County (TW)

(72) Inventors: Wei-Ting Yeh, Taoyuan County (TW); Kang-Ming Peng, Taoyuan County (TW)

(73) Assignee: BenQ Materials Corporation, Taoyuan (TW)

( * ) Notice: Subject to any disclaimer, the term of this patent is extended or adjusted under 35 U.S.C. 154(b) by 318 days.

(21) Appl. No.: 14/179,568

(22) Filed: Feb. 13, 2014

(65) Prior Publication Data

US 2014/0356688 A1    Dec. 4, 2014

(30) Foreign Application Priority Data

May 30, 2013    (TW) .............................. 102119134 A

(51) Int. Cl.
*H01M 2/16* (2006.01)
*H01M 2/14* (2006.01)
*H01M 10/052* (2010.01)

(52) U.S. Cl.
CPC ........... *H01M 2/1653* (2013.01); *H01M 2/145* (2013.01); *H01M 2/1686* (2013.01); *H01M 10/052* (2013.01)

(58) Field of Classification Search
CPC ............. H01M 2/1653; H01M 2/145; H01M 2/1686; H01M 10/052
USPC .......................................... 429/145; 156/248
See application file for complete search history.

(56) References Cited

U.S. PATENT DOCUMENTS

| | | | | |
|---|---|---|---|---|
| 2001/0041289 A1* | 11/2001 | Hikmet | ................... | H01M 4/13 429/212 |
| 2009/0008142 A1* | 1/2009 | Shimizu | ................... | B32B 5/18 174/261 |

FOREIGN PATENT DOCUMENTS

| | | |
|---|---|---|
| CN | 102197511 A | 9/2011 |
| TW | 200800609 A | 1/2008 |

\* cited by examiner

*Primary Examiner* — Gary Harris
(74) *Attorney, Agent, or Firm* — CKC & Partners Co., Ltd.

(57) ABSTRACT

The present disclosure provides a separator for lithium battery, particularly to a separator including a middle layer formed by a punch method. Also, a manufacturing method of the separator is provided. The separator formed by the punch method has a better heat-resistant property in an elevated temperature and features a high mechanical strength.

5 Claims, 3 Drawing Sheets

SEPARATOR OF LITHIUM BATTERY AND MANUFACTURING METHOD THEREOF

RELATED APPLICATIONS

This application claims priority to Taiwan Application Serial Number 102119134, filed May 30, 2013, which is herein incorporated by reference.

BACKGROUND OF THE DISCLOSURE

1. Field of the Disclosure

The present disclosure relates to a separator for lithium battery, and more particularly to a separator with a middle layer formed by a punch method and a manufacturing method thereof.

2. Description of the Related Art

In general, a battery used for power supply comprises a positive electrode, a negative electrode, an electrolyte and a separator. The separator is disposed between the positive electrode and the negative electrode to electrically space the positive electrode and the negative electrode apart from each other, so as to prevent electrical short circuit or even an unexpected explosion in the battery. In addition, a separator includes a plurality of micropores used to accommodate the electrolyte.

In case a battery separator fails to electrically insulate the positive electrode from the negative electrode, the battery is potentially subject to a short circuit which is likely to turn into a thermal runaway and even an explosion. A microporous polyolefin separator with multi-layer structure has been developed for use in the battery (e.g., a secondary lithium battery). While the temperature of the battery is high enough to the melting point of anyone of layers of the microporous polyolefin separator, the layer is melted to shutdown the micro pores of the microporous polyolefin separator. As a result, the lithium ion flow of the battery is blocked, which interrupts the current of the battery. It is needed to decrease the risk of the battery subject to thermal runaway or even the explosion.

Currently, the separators in the market are made of polyethylene and/or polypropylene in a single layer, multi-layers or a composite layer structure. For example, U.S. Pat. No. 5,691,077 discloses a tri-layer battery separator constructed by polypropylene-polyethylene-polypropylene layers and a manufacture method for the same. The manufacture method comprises steps of: forming a polypropylene precursor; forming a polyethylene precursor; stretching the polypropylene and polyethylene precursor to form a polypropylene microporous film and a polyethylene microporous film; bonding the two polypropylene microporous film and the polyethylene microporous film in a order of polypropylene, polyethylene, and polypropylene films, bonding or hot pressing to generate a three-layer battery separator. The three-layer battery separator has a shutdown temperature about 130° C.

The melting point of polypropylene is higher than that of polyethylene, and the breakdown strength of the polypropylene is stronger than that of the polyethylene. In this regard, if the internal temperature of the battery with tri-layer separator (polypropylene/polyethylene/polypropylene) reaches a temperature of 130° C., the microporous polyethylene of the tri-layer separator will be melted and be blocked, while the microporous polypropylene film maintains the structure and mechanical property thereof. It still keeps the positive electrode and the negative electrode electrically insulated apart from each other and thus may maintain the safety of the battery. However, in case the internal temperature of the battery is raised and kept in about 130° C. for a period of time, even though the outer polypropylene microporous film maintains the structure and mechanical property of the separator, the separator of microporous polypropylene and polyethylene films may start to shrink. The edge regions of the two electrodes may be exposed to each other and increase the risk of the thermal runaway the explosion of the battery.

Therefore, the present disclosure provides a method for manufacturing separators with a middle layer formed by a punch method. Because no stretch processing is applied in the formation of the microporous structure of the middle layer, the separator with a punched middle layer has a better heat resistant and a high mechanical strength at the elevated temperature.

SUMMARY OF THE DISCLOSURE

According to an aspect of the present disclosure, a separator is provided to use for lithium batteries, which comprises a first polyolefin layer having a microporous structure; a middle layer having a microporous structure; a first adhesive layer on one side of the middle layer bonding the middle layer and the first polyolefin layer; a second polyolefin layer having a microporous structure; and a second adhesive layer on another side of the middle layer configured for bonding the middle layer and the second polyolefin layer, wherein the microporous structure of the middle layer, the first adhesive layer and the second adhesive layer are individually formed by a punch process.

According to another aspect of the present disclosure, a method for manufacturing a separator for lithium battery is provided. The method comprises the steps of providing a polymer film having two surfaces, in which each of the surfaces has a release film; punching the polymer film by a mechanical punching machine or a laser punching machine to form a microporous structure in the polymer film; removing the two release films from the two surfaces of polymer film; respectively providing a first polyolefin film with a microporous structure and a second polyolefin film with a microporous structure on each of the two surfaces of the polymer film; and thermally pressing and bonding the first polyolefin film and the second polyolefin film to the two surfaces of the polymer film, respectively.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Figure 1:
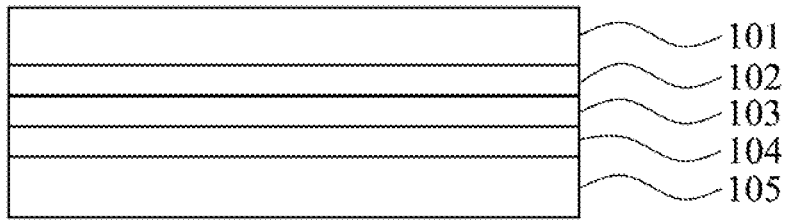
FIG. 1 is a schematic diagram of one embodiment of a separator used in a lithium battery.

Referring to FIG. 1, a schematic diagram of one embodiment of a separator 100 used in a lithium battery is shown. The separator 100 is placed between a positive electrode and a negative electrode of the lithium battery. The separator 100 keeps the positive electrode and the negative electrode electrically insulated apart from each other. In addition, the separator 100 includes a microporous structure used to fill with electrolyte. The ion of the electrolyte can pass through the microporous structure of the separator 100 to generate electric current.

The separator 100 includes a first polyolefin layer 101, a first adhesive layer 102, a middle layer 103, a second adhesive layer 104 and a second polyolefin layer 105. The first adhesive layer 102 and the second adhesive layer 104 are respectively placed between the first polyolefin layer 101 and the middle layer 103 for bonding the first polyolefin layer 101 and the middle layer 103 and between the middle layer 103 and the second polyolefin layer 105 for bonding the middle layer 103 and the second polyolefin layer 105. The first polyolefin layer 101, the first adhesive layer 102, the middle layer 103, the second adhesive layer 104 and the second polyolefin layer 105 are positioned in order as shown in FIG. 1.

The first polyolefin layer 101 and the second polyolefin layer 105 are made of polyolefin films having microporous structures. In general, the first polyolefin layer 101 and the second polyolefin layer 105 is fabricated from either a dry process or a wet process known by the artisans with general skills in the related art for forming the microporous structure thereon.

Referring to the embodiment as shown in FIG. 1, the first polyolefin layer 101 and the second polyolefin layer 105 are both single-layer polyolefin film. The single-layer polyolefin film is selected from, but is not limited to, a group consisting of polyethylene (PE), low-density polyethylene (LDPE), linear low-density polyethylene (LLDPE), high density polyethylene (HDPE), polypropylene (PP), and ultra high molecular weight polyethylene (UHMWPE). In the present embodiment, the preferred single-layer polyolefin film is polypropylene. The first polyolefin layer 101 and the second polyolefin layer 105 both have a Gurley value of less than 300 sec/100 cc, a thickness of 8 to 100 um, a pore diameter of 0.1 to 1 um and a porosity of 40-80%.

In another embodiment of the present invention, one or more microporous polyolefin film can be further laminated on the outermost layer of the separator 100 to fabricate a multilayer polyolefin separator. For example, one single-layer microporous polyethylene film and one single-layer microporous polypropylene film are respectively laminated the outermost layer of the separator 100 (microporous polypropylene film). In another embodiment of the present invention, one single-layer microporous polypropylene film and one single-layer microporous polyethylene film are respectively laminated to the outermost layer of the separator 100 (microporous polyethylene film). In this embodiment, the first polyolefin layer 101 or second polyolefin layer 105 are respectively multi-layer microporous films (not shown). It should be noted, the number of microporous polyolefin layers to be laminated to the separator 100 depends on the requirement of the heat resistance or the mechanical strength of a separator. The number of microporous polyolefin layers is not particularly limited.

Because the separator 100 is required to have a heat resistance (100-130° C.), the first adhesive layer 102 and the second adhesive layer 104 are adhesive material having sufficient heat resistance, such as an acrylic resin with heat resistant. In one embodiment of the present invention, the thickness of the acrylic resin can be varied from 0.1 to 100 um in respect to the thickness of separator 100.

Figure 2:
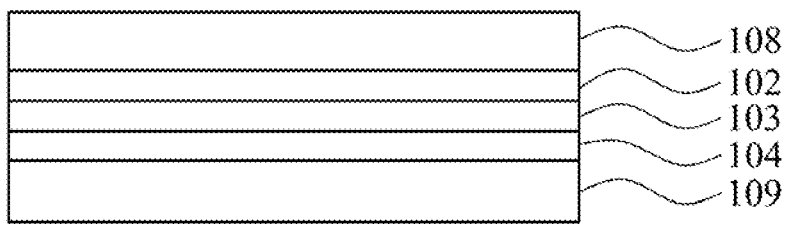
FIG. 2 is a schematic diagram of one embodiment of a polymer film used for manufacturing the separator.

Referring to FIG. 2, a schematic diagram of one embodiment of a polymer film 200 used for manufacturing the separator 100. The polymer film 200 includes a first release layer 108, the first adhesive layer 102, the middle layer 103, the second adhesive layer 104 and a second release layer 109. The first release layer 108 and the second release layer 109 are placed on two sides of the polymer film 200 respectively for a protective purpose and can be removed when using. Before removing the first release layer 108 and the second release layer 109, the first adhesive layer 102 is for bonding one side of the middle layer 103 and the first release layer 108. The second adhesive layer 104 is for bonding the other side of the middle layer 103 and the second release layer 109. The polymer film 200 for manufacturing the separator 100 originally does not have microporous structure.

Figure 3:
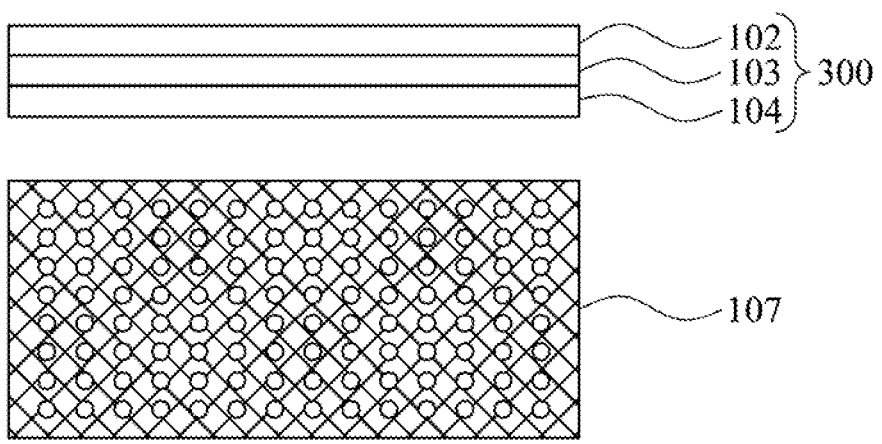
FIG. 3 is a schematic diagram of one embodiment of a separator.

The polymer film 200, as shown in FIG. 2, is punched with a punch device, and then peels off the first release layer 108 and the second release layer 109 from the punched polymer film 200 to generate a polymer microporous film 300, as shown in FIG. 3. The microporous polymer film 300 includes the first adhesive layer 102, the middle layer 103, and the second adhesive layer 104. The pattern 107 shown in FIG. 3 is a top view of the punched microporous polymer film 300. The microporous polymer film 300 have a microporous structure as shown in FIG. 3. Please note that the pattern 107 of the microporous polymer film 300 is an example for illustrations only and not limited to it.

The middle layer 103 is selected from a polymer film with a high melting point or glass transition temperature, such as, polypropylene (PP), polyethylene terephthalate (PET), vinylidene fluoride (PVDF), polyamides (PA), polyimide (PI), polyoxymethylene (POM), and polymethylpentene (TPX) film. In one embodiment of the present invention, the middle layer 103 is a PET film. The thickness of the PET film is preferred from 3 to 100 μm in order for the punch process.

Both the first release layer 108 and the second release layer 109 are easily to be peeled off. Especially, the first release layer 108 and the second release layer 109 are easily to be peeled off from the first adhesive layer 102 and the second adhesive layer 104. Before the peeling process and the punch process, the first release layer 108 and the second release layer 109 protect the first adhesive layer 102, the middle layer 103 and the second adhesive layer 104. The first release layer 108 and the second release layer 109 can be selected from the group including but not limited to polyethylene (PE), polypropylene (PP), polyethylene terephthalate (PET), vinylidene fluoride (PVDF), polyimide (PA), polyimide (PI), polyoxymethylene (PGM), and polymethylpentene (TPX) film. In an embodiment of the present invention, the first release layer 108 and the second release layer 109 are the PET film and preferred from 3 to 100 μm for the punch process.

Figure 4:
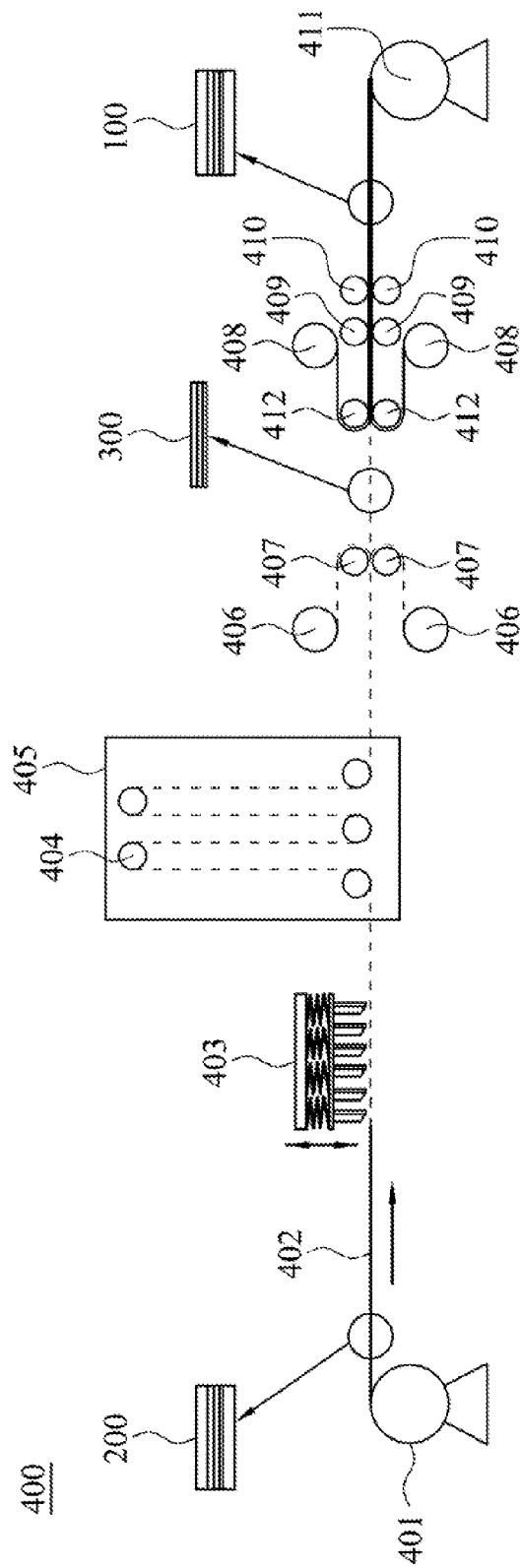
FIG. 4 is a schematic diagram of one embodiment of a plurality of processing equipments used for manufacturing the separator used in the lithium battery.

Referring to FIG. 4, a schematic diagram of one embodiment of a system used for manufacturing the separator 100 used in the lithium battery of the present invention. The system used for manufacturing the separator of the present invention includes a first feeding roller 401, a transportation unit 402, a punching means 403, a plurality of guide rollers 404, an accumulator 405, a collecting roller set 406, a peeling roller set 407, a second feeding roller set 408, a nip roller set 409, a hot laminating roller set 410, a rewinding roller 411 and a joining roller set 412.

The first feeding roller 401 is used to feed a polymer film 200 to the transmission unit 402.

The transportation unit 402 sets up in the processing path of the processing system. The transportation unit 402 includes a plurality of guide rollers 404 and load cells (not shown). The plurality of guide rollers 404 and load cells are placed at two sides of the processing path of the processing system. The transportation unit 402 transports the separator 100 and the polymer film 200 in the processing path of the processing system.

The punching device 403 is placed after the first feeding roller 401 for punching the polymer film 200 transported by the transmission unit 402 from the first feeding roller 401 and executing a punching process on the polymer film 200. The punching device 403 can be a mechanical punching machine or a laser punching machine. In one embodiment, the punching device 403 is a $CO_2$ laser machine. The $CO_2$ laser machine punches the polymer film 200. The polymer film 200 has a good light-adsorbing ability to the $CO_2$ laser light and it is easy to control pore size and area ratio of the micro pores by a programmable $CO_2$ laser machine. For example, the $CO_2$ laser punching machine punches pores on the polymer film 200 to form pores with a diameter of 0.02 to 0.5 mm. The pore area is about 70%-80% of the entire area of the polymer film 200. In another embodiment of the present disclosure, a mechanical punching machine can be used for punching pores on polymer film 200 to generate pores with a diameter of 15 µm to 10 mm. The area of pores is about 40%-80% of the entire area of the polymer film 200.

Specially, in some embodiments of the present disclosure, a programmable mechanical punching machine or a programmable laser punching machine is used to form the microporous structure. It is understood that the arrangement of the pores is not restricted as long as the size of the pores and the area of pores is in the above mentioned range and suitable for a separator. The programmable mechanical punching machine or the programmable laser punching machine is well used in the related technologies. The punching operation can be conducted by the existed programmable mechanical punching machine or programmable laser punching machine.

The accumulator 405 sets up in a part of the processing path of manufacture system. In one embodiment of the present disclosure, the accumulator 405 is placed after the punching device 403 and receives a punched polymer film 200. The accumulator 405 can be used to control and adjust the transportation of the polymer film 200.

The peeling roller set 407 is placed after the accumulator 405 for peeling off the first release layer 108 and the second release layer 109 from the punched polymer film 200 to form a polymer microporous film 300.

The collecting roller set 406 is for collecting the first release layer 108 and the second release layer 109 peeled off from the peeling roller set 407.

A second feeding roller set 408 is placed after the peeling roller set 407 and includes two rollers for feeding the first polyolefin layer 101 and the second polyolefin layer 105 respectively. The second feeding roller set 408 feeds the films of the first polyolefin layer 101 and the second polyolefin layer 105 to the joining roller set 412.

The joining roller set 412 connects to the second feeding set 408 and receives the films of the first polyolefin layer 101 and the second polyolefin layer 105. In addition, the joining roller set 412 bonds the first polyolefin layer 101 and the second polyolefin layer 105 to two sides of the polymeric microporous film 300 to generate a composite film.

At least one nip roller set 409 is places after the joining roller set 412 for receiving the joined composite film and nipping the composite film. The nip process makes the joined composite film more firmly.

At least one hot laminating roller set 410 is placed after the nip roller set 409. The hot laminating roller set 410 is designed to provide heat and pressure to press the composite film to form the separator 100.

A rewinding roller 411 is placed after the hot laminating roller set 410 for receiving the separator 100.

Figure 5:
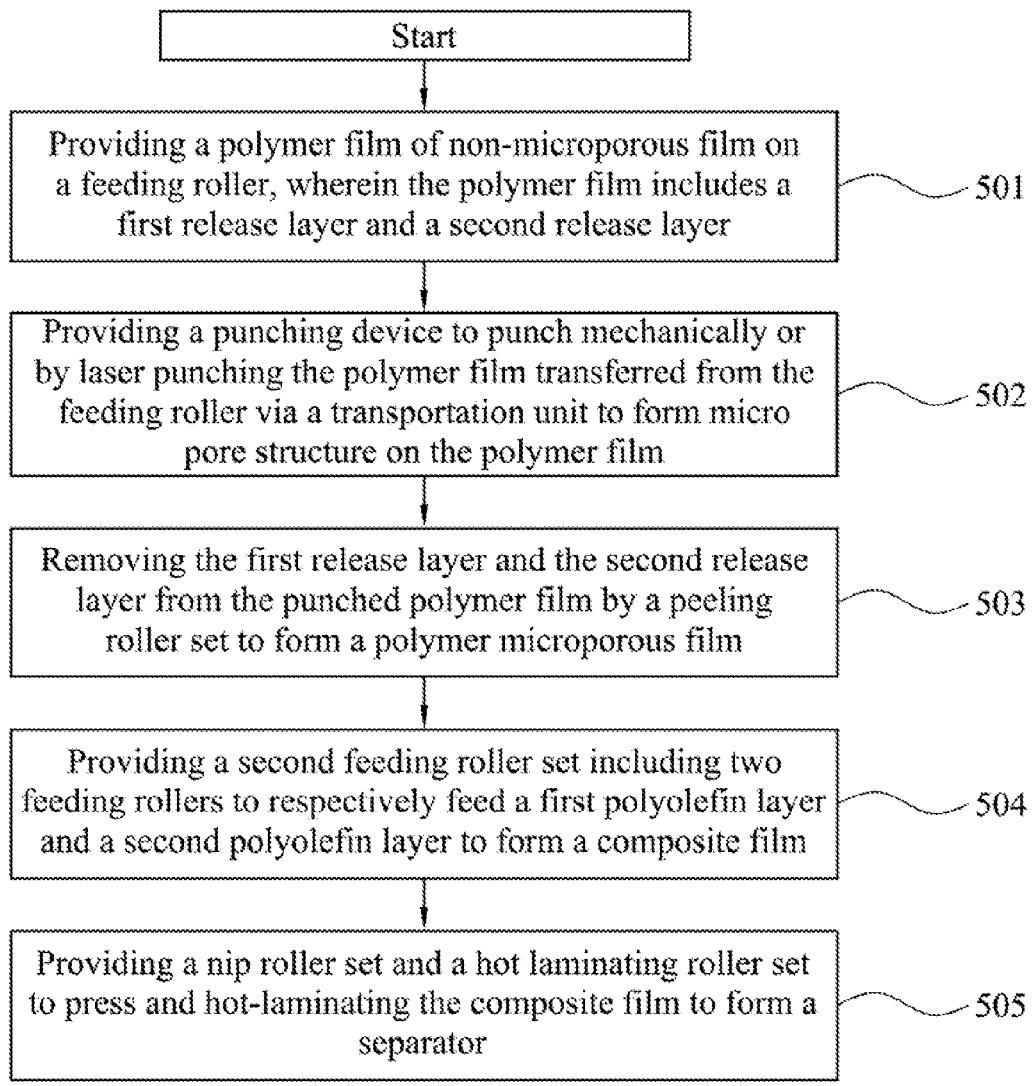
FIG. 5 is a flowchart illustrating one embodiment of a method for manufacturing a separator used in the lithium battery.

Referring to FIG. 5, a flowchart is shown to illustrate the method for manufacturing the separator 100 used in the lithium battery in accordance with an embodiment of the present disclosure. This embodiment illustrates the steps of manufacturing the separator 100 from the polymer film 200 (shown in FIG. 2) via the manufacture system illustrated in FIG. 4. The steps are described as below.

Firstly, in step S501, the polymer film 200 is provided on the first feeding roller 401. The polymer film 200 includes the first release layer 108 and the second release layer 109. However, the polymer film 200 is a non microporous film. The first feeding roller 401 feeds the polymer film 200 to the transportation unit 402 in the processing path of the manufacture system. Under tension control of the plurality of guide rollers 404 and load cells (not shown in the Figs.,) the polymer film 200 can continually maintain a flat surface in the processing path.

In step S502, the punching device 403 is provided to punch the polymer film 200 transferred from feeding roller via the transportation unit 402 to form micro pore structure on the polymer film 200. In one embodiment of the present disclosure, the punching device 403 can be a mechanical punching machine or a laser punching machine. It should be noted that the release layer of the polymer film 200 is still remained. In one embodiment of the present invention, an accumulator 405 is placed after the punching device 403. The accumulator 405 is provided to transport the punched polymer film 200 and adjust the transportation speed of the polymer film 200 to meet the punching speed of the punching device 403. The punching device can be a mechanical punching machine or a laser punching machine.

In step S503, the peeling roller set 407 removes the first release layer 108 and the second release layer 109 from the punched polymer film 200 to generate the polymer microporous film 300 (as shown in FIG. 3). The punched microporous polymer film 300 includes a first adhesive layer 102, a middle layer 103 and a second adhesive layer 104 and has a plurality of microporous structure. The pattern 107 shown in FIG. 3 is a top view of the punched microporous polymer film 300 including the first adhesive layer 102, the middle layer 103 and the second adhesive layer 104.

In step S504, a second feeding roller set 408 including two feeding rollers is provided to feed the first polyolefin layer 101 and the second polyolefin layer 105 respectively into the manufacture system. The second feeding roller set 408 feeds the first polyolefin layer 101 and the second polyolefin layer 105 to the joining roller set 412. The joining roller set 412 bonds the first polyolefin layer 101 and the second polyolefin layer 105 respectively to the two sides of the punched microporous polymer film 300 to generate a composite film.

In step S505, a nip roller set 409 and a hot laminating roller set 410 are provided for pressing and hot-laminating the composite film to generate the separator 100.

After the steps of S501, S502 and S503, the polymer film 200 (shown in FIG. 2) is transformed into the microporous polymer film 300 (as shown in FIG. 3). Then, the microporous polymer film 300 is processed by the step S504, and the joining roller set 412 bonds the first polyolefin layer 101 and the second polyolefin layer 105 to two sides of the microporous polymer 300 to form the separator 100 as shown in FIG. 1.

Embodiment 1

In the embodiment 1 of the present disclosure, a polymer film having five-layers structure is described. The polymer film includes a PET film as a first release layer, an acrylic resin as a first adhesive layer and a second adhesive layer, a PET film as a middle layer, and a PET film as a second release layer.

The each layer of the polymer film described above has a thickness as followings. The first release layer has a thickness of 50 μm, the first adhesive layer has a thickness of 3 μm, the middle layer has a thickness of 3.5 μm, the second adhesive layer has a thickness of 3 μm and the second release layer has a thickness of 50 μm.

The first polyolefin layer and the second polyolefin layer used in this embodiment are single microporous polypropylene film having pores small than 1 μm and a thickness of 14 μm. After conducting the process of the present invention, shown in FIG. 5, a separator is manufactured in this embodiment 1.

In addition, a commercial tri-layer separator is used as a comparison example. Table 1 shows the properties of the separator manufactured in the embodiment 1 and the commercial tri-layer separator of the comparison example.

TABLE 1

| | Layer | Embodiment 1 (PP/PET/PP) | Comparison example (PP/PE/PP) |
|---|---|---|---|
| Thickness (μm) | 1st polyolefin layer | 14 μm | — |
| | 1st adhesive layer | 3 μm | — |
| | Middle layer | 3.5 μm | — |
| | 2nd adhesive layer | 3 μm | — |
| | 2nd adhesive layer | 14 μm | — |
| | Total thickness | 37.5 μm | 40 μm |
| Pore Size | $1^{st}/2^{nd}$ adhesive layer and middle layer | 15 μm~10 mm | — |
| | $1^{st}/2^{nd}$ polyolefin layer | <1 μm | — |
| Gurley (sec/10 cc) | | 30.2 | 30 |
| MD Shrinkage (%, at 130° C./1.5 hr) | | 10 | 37 |
| Puncture Strength (g/um) | | 19.8 | 14.9 |
| Tensile strength in MD direction (kg/cm²) | | 1310 | 1598 |
| Tensile strength in TD direction (kg/cm²) | | 195 | 108 |

From the data of the embodiment 1, it shows that the Gurley value of the separator manufactured in the embodiment 1 is 30.2 sec/10 cc; the tensile strength in MD direction of the separator is 1310 kg/cm²; the puncture strength of the separator is 19.8 g/um and the tensile strength in TD direction of the separator is 195 kg/cm². The above properties of the present separator meet the basic conditions of commercial separators. In addition, under an environment test at temperature 130° C. for 1.5 hours, the tensile shrinkage in MD direction of the separator manufactured in the embodiment 1 is 10%. In comparison with the tensile shrinkage in MD direction of the commercial tri-layer separator, which is 37%, it appears a great reduce in shrinkage rate of about 72.9%.

In addition, the tensile strength in TD direction of the separator manufactured in the embodiment 1 is 195 kg/cm². In comparison with the tensile strength in TD direction of the commercial tri-layers separator, which is 108 kg/cm², the tensile strength in TD direction of the separator is increased to a rate of about 79%.

It is obvious from the results of the separator of embodiment 1 and that of the commercial separator that the separator of the present disclosure manufactured by punching the middle layer via a mechanical punching process or a laser punching process can provide a better tensile strength in TD direction and a less tensile shrinkage in MD direction than those of commercial separators. Moreover, the separator of the present invention can maintain the properties under an elevated temperature condition.

It should be noted that the thickness of each layer of the present separator may be various in accordance with the implement of the punching process. The present disclosure is to provide a manufacture method for a multilayer separator with a punched middle layer. In comparison with the commercial separators manufactured by other process, the separator disclosed in the present disclosure has a better mechanical strength. The range of thickness and the selection of material of each layers of the separator are not limited to the scope of embodiments.

While the disclosure has been described by way of examples and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a separator for lithium battery, comprising:
   providing a polymer film having two surfaces, each of the surfaces having a release film;
   punching the polymer film by a mechanical punching machine or a laser punching machine to form a microporous structure in the polymer film;
   removing the two release films from the two surfaces of the polymer film;
   respectively providing a first polyolefin film and a second polyolefin film both having microporous structure on each of the two surfaces of the polymer film; and
   thermally pressing and bonding the first polyolefin film and the second polyolefin film to the two surfaces of the polymer film, respectively.

2. The method as claimed in claim 1, wherein the polymer film is punched by mechanical punching machine to have a porosity of 40-80% of the polymer film.

3. The method as claimed in claim 1, wherein the polymer film is punched by laser punching machine to form a porosity of 70-80% of the polymer film.

4. The method as claimed in claim 1, wherein the polymer film is a polyethylene terephthalate film.

5. The method as claimed in claim 1, wherein the first polyolefin film and second polyolefin film are individually a single-layer polypropylene film.

* * * * *